United States Patent Office 3,470,239
Patented Sept. 30, 1969

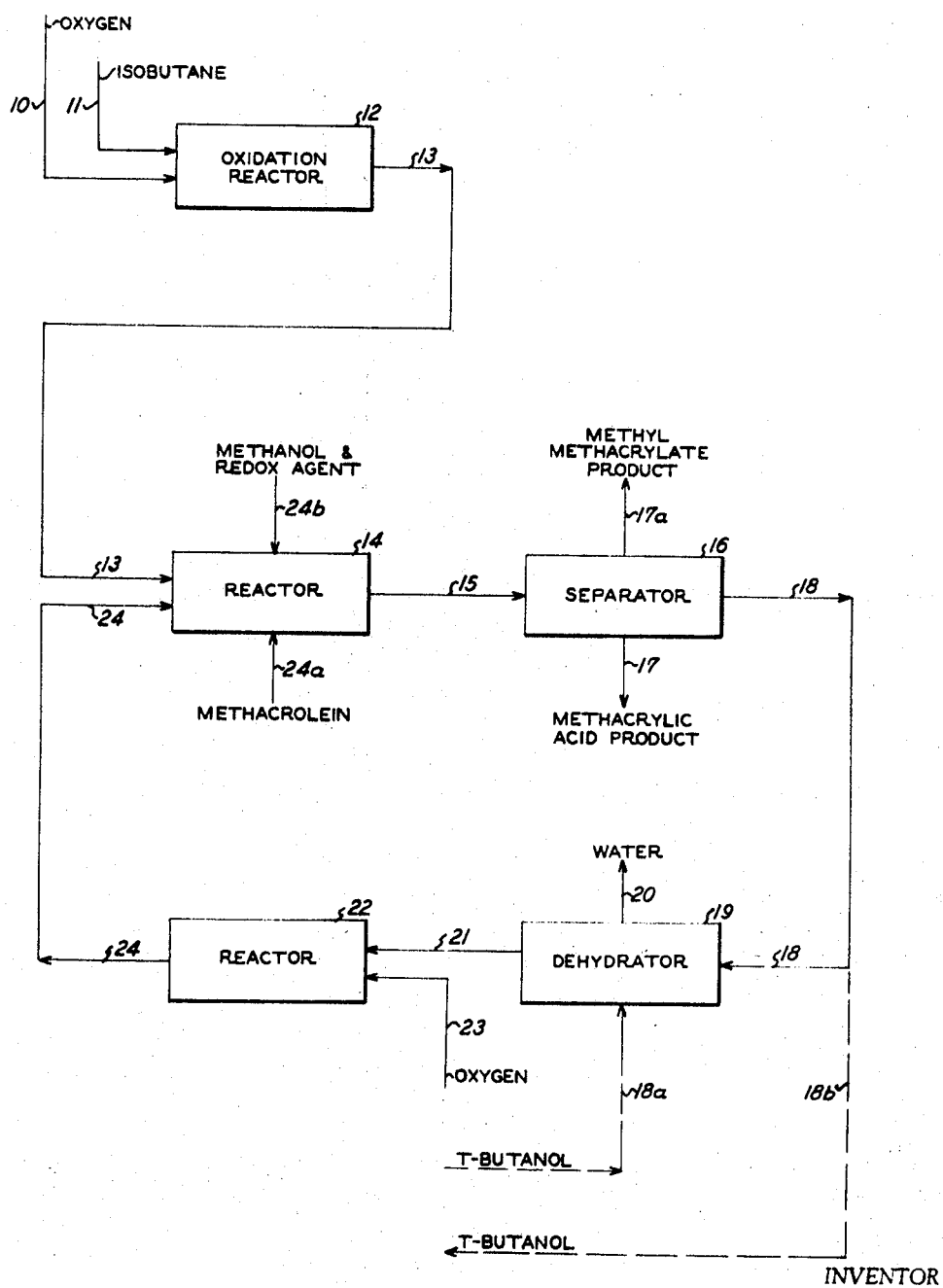

1

3,470,239
PROCESS FOR PREPARING METHACRYLIC ACID AND ITS ESTERS FROM ISOBUTANE
Joseph L. Russell, Ridgewood, N.J., assignor to Halcon International, Inc., a corporation of Delaware
Continuation of application Ser. No. 688,623, Dec. 6, 1967, which is a continuation of application Ser. No. 333,106, Dec. 24, 1963. This application June 7, 1968, Ser. No. 739,940
Int. Cl. C07c 51/20, 67/00, 69/54
U.S. Cl. 260—486                                    7 Claims

ABSTRACT OF THE DISCLOSURE

This invention relates to processes for preparing methacrylic acid or ester from isobutane, more particularly to cyclic processes wherein isobutane is converted to tertiary butyl hydroperoxide which in turn is reacted with methacrolein to form methacrylic acid or ester (from added alcohol reactant) product and tertiary butyl alcohol, at least some of the said methacrolein being obtained from said tertiary butyl alcohol, and the acid or ester is recovered as substantially the only product.

---

This application is a continuation of Ser. No. 688,623, filed Dec. 6, 1967, now abandoned, which in turn is a continuation of Ser. No. 333,106, filed Dec. 24, 1963, now also abandoned.

Methacrylic acid and its methyl ester are commercially important materials, and various processes have been suggested for their preparation. However, so far as it is known, the art is still confronted by the problem of providing even more economical processes for their manufacture from readily available low cost materials, especially low cost isobutane.

The discoveries associated with the invention and relating to the solution of the above problems, and the objects achieved in accordance with the invention as set forth herein include the provision of:

the process for preparing methacrylic material from isobutane which comprises oxidizing the isobutane to t-butylhydroperoxide, reacting said hydroperoxide with methacrolein to produce tertiary butyl alcohol and the methacrylic material, the latter being recovered as substantially the only product, at least some of said methacrolein being obtained from said tertiary butyl alcohol;

such a process wherein the tertiary butyl alcohol is converted directly to methacrolein by treatment with oxygen in the vapor phase at elevated temperature over a catalyst, and the methacrolein is converted to methacrylic ester by reaction with t-butylhydroperoxide in the presence of a non-tertiary alkanol material and a redox material;

such a process wherein the redox material is a soluble iron salt and the alkanol is monohydric and contains one to twelve carbon atoms;

such a process wherein the iron salt is used in an amount in the range of 0.05 to 2.0 equivalents per equivalent of hydroperoxide;

such a process wherein the amount of iron salt is in the range of 0.1 to 0.5 equivalent per equivalent of hydroperoxide;

such a process wherein the iron salt is ferrous chloride;
such a process wherein the iron salt is ferric chloride;
such a process wherein the iron salt is ferrous bromide;
such a process wherein the iron salt is ferric bromide;
such a process wherein the redox material is a cupric salt;
such a process generally wherein the reaction of the hydroperoxide with methacrolein is carried out in the presence of a redox reducing agent in at least stoichiometric amount relative to the hydroperoxide and also a lower monohydric alcohol of one to twelve carbon atoms whereby the methacrylic ester of said alcohol is produced;

such a process wherein the reaction mixture contains substantially stoichiometric amounts of the hydroperoxide and methacrolein, and an excess of the monohydric alcohol;

such a process wherein the redox material includes ferrous ion;

such a process wherein the lower alcohol is methanol and methyl methacrylate is recovered as product;

such a process wherein the redox material includes ferrous chloride;

such a process wherein there is mixed with the ferrous ion a small proportion of a redox material in its oxidizing state;

such a process including a reducing agent;

such a process wherein the reducing agent is sodium bisulfite;

such a process wherein methacrolein is converted to methacrylic ester by reaction with t-butyl hydroperoxide in the presence of a non-tertiary alkanol and chromic, or phosphomolybdic, or tungstochromic, or selenochromic, or phosphonavadic acid;

and other objects which will be apparent as details or embodiments of the invention are set forth hereinafter.

The accompanying drawing is a schematic flow diagram illustrating one embodiment of the invention, with alternatives thereof.

Referring to the accompanying drawing, isobutane is reacted in reactor 12 with molecular oxygen to form tertiary butyl hydroperoxide. The isobutane is fed via line 11 into oxidation reactor 12 and gaseous oxygen or air is fed via line 10. The resulting reaction mixture containing tertiary butyl hydroperoxide (or optionally a concentrate of the latter) is passed via line 13 to reactor 14 wherein the tertiary butyl hydroperoxide is reacted with methacrolein introduced via line 24 (and optionally via line 24a) to form methacrylic acid and tertiary butyl alcohol. The reaction mixture is passed via line 15 to separator 16, and methacrylic acid product is removed therefrom via line 17. Tertiary butanol by-product is removed therefrom via line 18 and passed to dehydrator 19 wherein it is dehydrated to isobutylene. Optionally, some t-butanol may be removed via line 18b, or added via line 18a. Water formed as a by-product is removed via line 20. Isobutylene is passed via line 21 to oxidizer 22 wherein it is reacted with molecular oxygen to form methacrolein. The gaseous oxygen is introduced via line 23. The methacrolein formed is passed via line 24 to reactor 14 for further production of methacrylic acid.

In the alternate wherein ester is the desired product, the alcohol, methanol (or the like) and redox or other agent is fed via line 24b to reactor 14, and methyl (or the like) methacrylate is removed via line 17a from separator 16.

In order to indicate still more fully the nature of the present invention, the following examples of typical procedures are set forth herein, in which parts and percents means parts and percents by weights, respectively, unless otherwise indicated, it being understood that these examples are presented as illustrative only and they are not intended to limit the scope of the invention.

Example 1

In this example isobutane is reacted with oxygen to produce tertiary butyl hydroperoxide, which is reacted with methacrolein to produce methacrylic acid, and t-butanol. The latter is used to prepare methacrolein preferably so that only the isobutane and oxygen are consumed.

In the first step, isobutane is reacted in the vapor phase with air and hydrogen bromide catalyst at a pressure of about 1 atms. and a temperature of 160° C., using 2 mols oxygen per mol isobutane and a space velocity of about 1000 volumes of gaseous mixture/vol. of reactor/hour. The effluent gaseous mixture is cooled to about 30° C. and condensed, and tertiary butyl hydroperoxide is recovered from the condensate by distillation at about 50° C., in known manner. The conversion of isobutane is 30%, and the selectivity of isobutane reacted to tertiary butyl hydroperoxide is 65%. Unreacted isobutane is recovered and recycled.

Alternatively, the isobutane is oxidized by passing oxygen through 800 grams of liquid isobutane, to which 5 grams of di-tertiary-butyl peroxide and 1 gram of iron naphthenate had been added, in a stainless steel reactor at a temperature of 110° C. and 600 p.s.i.g. The operation is continued until 25% of the isobutane is converted.

Analysis of the resulting reaction products (isobutane-free) shows a tertiary-butyl hydroperoxide equivalent per 100 grams of about 1.0.

The oxidation of isobutane may be carried out so as to favor forming substantially all tertiary butyl hydroperoxide. However, it is also possible to obtain a mixture of tertiary butyl hydroperoxide and tertiary butyl alcohol, and these may be separated by distillation. If there is a suitable market, excess t-butanol may be sold. Since, as hereinafter designated, tertiary butyl alcohol is a desirable component of the system used to oxidize methacrolein to methacrylic acid with the hydroperoxide, separation of t-butanol from the hydroperoxide is not required for this invention. The fact that such separation need not be carried out is, of course, economically advantageous. In addition to the above techniques, any of the known methods for reacting isobutane with molecular oxygen to form tertiary butyl hydroperoxide can be used.

In the next step of the process the hydroperoxide is used to oxidize methacrolein to methacrylic acid.

A mixture of t-butanol (41 grams), methacrolein (4.2 grams), chromic acid ($CrO_3$), 1.0 gram), and t-butylhydroperoxide (5.3 grams), is mixed at room temperature, and heated to 40° C., and held there with agitation for three hours. The resulting mixture analyzes 3.5% methacrylic acid, by gas chromatography. The methacrolein conversion is 48% and the selectivity of the reaction to methacrylic acid based on methacrolein is 81.5%. Methacrolein is also analyzed by gas chromatography. The acid and the alcohol are separated by distillation, at about 40° C.

To produce the methyl ester directly, a mixture of methacrolein (7.5 grams), methanol (50 cc.) and $FeCl_2$, $4H_2O$ (10.0 grams) is stirred and brought to 5° C. (with cooling) and t-butylhydroperoxide (12.5 grams is added slowly (the temperature to 15° C.) then the mixture is allowed to rise to room temperature 25° C.) and held there for over the next 3 minutes. The resulting mixture is then distilled, the methyl methacrylate methanol azeotrope is extracted with water and the ester is recovered in good yield based on methacrolein reacted (unreacted methacrolein is recovered and recycled).

At least enough methanol is fed to reactor 14 to form the ester and also form the azeotrope, so that the ester can be separated readily. The t-butanol is recovered (as already described) and recycled, as is the methanol in the azeotrope.

In this step, the hydroperoxide is converted to tertiary butyl alcohol, on substantially a mol for mol basis. This alcohol is used to produce methacrolein, which is then passed to the second step; i.e., oxidized to methacrylic acid. The tertiary butyl alcohol may be dehydrated to isobutylene thermally or over a suitable catalyst such as activated alumina or silica-alumina at a temperature in the range of 150° to 500° C. in known manner with substantially 100% yield of the olefin. Alternatively, the catalyst may be 48% hydrobromic acid.

The isobutylene is oxidized to methacrolein by means of air or gaseous oxygen in the vapor phase over a suitable catalyst, at a conversion per pass of about 20 to 60% or more, and a selectivity of 45 to 70%.

A typical catalyst (approximately 300 cc.) is prepared by impregnating aqueous solutions of metal salts as chlorides, sulfates, nitrates or the like on a support, generally porous silicon carbide, then evaporating the mixture to dryness up to 120° C., then placing the impregnated support in a muffle furnace overnight (15 hours) at 400° C.

In this run using dry air containing 4.22 mol percent of isobutene, at 320° C. and a space velocity thereof of 870 per hour (plus added steam at a space velocity of 545 per hour), the conversion per pass is 21% and the selectivity to methacrolein is 56%.

The unused olefin is separated by distillation, and recycled to this oxidation step, so that the overall yield of methacrolein is about 50% based on the olefin.

The particular catalyst used is prepared by dissolving copper chloride in ammonia to form a solution, adding thereto ammonium molybdate, ammonium chromate and ammonium phosphate. The resulting solution is mixed with irregular 4-mesh silicon carbide support and the support is impregnated as already described. The amount of impregnating materials used is such that for 100 grams of support, the added weight in the finished catalyst is 10 grams. The ratio of the materials used is such that for a formula weight of copper (as Cu) of one, the formula weight of molybdenum (mo) is 1.0, the formula weight of chromium (Cr) is 1.0, and the amount of phosphorous as phosphate ($PO_4$) is 15% based on the weight of the catalyst mixture on the support.

An other suitable catalyst may be used in this step, including other molybdenum containing catalyst or those containing silver, chromium, bismuth, vanadium or tin or combinations thereof in any form.

In another method for oxidizing the isobutylene to methacrolein, cuprous oxide supported on silica or the like may be used as the catlyst. Although medium porosity silicon carbide is a preferred support, other refractory support materials may be used, such as activated aluminum oxide, silica gel, alundum, diatomaceous earth, pumice, and the like. The carrier material may be in the form of pellets, lumps, granules, spheres, rings, or other formed pieces, or in other forms which may be of regular or irregular contour.

Generally, in carrying out the oxidation process, the vapors of the olefin are contacted with the catalyst in the presence of oxygen containing gas at a suitable reaction temperature and pressure. The reaction temperature may be in the range of 150° to about 600° C., preferably about 200° to about 450 C. The particular temperature used depends upon the activity of the catalyst, the particular olefin treated, the space velocity, and the ratio of olefin to oxygen. The space velocity of the reaction mixture generally is in the range of about 500 to 4000 hr.$^{-1}$. If desired, steam may be included as a diluent and where so used the added space velocity contributed thereby may be in the range of 500 to 2000 hr.$^{-1}$. The temperature is controlled to obtain the desired degree of conversion of the olefin, and also obtain the highest selectivity of the converted olefin to the desired acrolein or substituted acrolein product.

In an alternative procedure, the tertiary butyl alcohol is converted to methacrolein in one step by reaction with air in the vapor phase in the presence of water vapor over a catalyst such as phosphomolybdic acid suported on alumina or silicon carbide at a temperature of about 300° C. to 400° C., preferably 350° C., at atmospheric pressure and at a space velocity of about 1000 to 3000, preferably 2000/hour.

The invention here disclosed permits the production of methacrylic acid using inexpensive and abundantly available isobutane as the sole organic precursor therefor. It is a significant feature of the process that the amount of isobutene, required to produce methacrolein for subsequent oxidation to methacrylic acid, obtained from the isobutane in the normal operation of the various process steps can be varied over wide limits. A primary source of t-butanol (which is the intermediate from which the isobutene is obtained) is the hydroperoxide reduced in the methacrolein oxidation step. The amount of t-butanol here obtained bears a substantially fixed ratio, slightly less than 1 to 1 on a molar basis, to the amount of hydroperoxide reacted in the methacrolein oxidation step. Were this the only source of t-butanol, the isobutene available for the process would fall short of that needed since neither the conversion of isobutene to methacrolein nor the oxidation of methacrolein to methacrylic acid can be obtained in quantitive yields. However, as has earlier been pointed out, t-butanol is a normal co-product in the oxidation which produces t-butylhydroperoxide from isobutene; and the ratio of the hydroperoxide to the alcohol can be varied over wide limits, by suitable selections of operating conditions in this step.

Thus, for example, the alcohol to hydroperoxide ratio can be increased in the liquid phase isobutane oxidation either by increasing the degree of conversion in that step or by raising the temperature at which that oxidation is carried out. The ratio of alcohol to hydroperoxide can thus be economically controlled, by establishing suitable balance between these factors, among others.

It is an important feature of the cyclic process here first disclosed, to regulate the ratio of t-butanol to hydroperoxide obtained in the oxidation of isobutane so that the amounts of t-butanol produced in all steps of the cyclic process match but do not substantially exceed the process requirements for methacrolein in order that methacrylic acid or ester can be produced in any required amount but without the simultaneous production of co-products requiring disposal by sale or otherwise.

Of course, if a market exists for either t-butanol or isobutane or both, the cyclic process here described can be regulated to produce there materials as co-products to the extent, but only to the extent, desired to satisfy these markets. Such modifications in final product mix which can be obtained by regulation of the various process steps in the overall cyclic process are all contemplated in and are properly a part of this invention.

Example 2

The procedure of Example 1 is repeated using 100 mols of isobutane. It is converted in the liquid phase to t-butyl hydroperoxide in about 60% (mol) overall yield (recovering and recycling the unused isobutane from each pass). The remaining 40% is primarily t-butanol. The hydroperoxide is used to convert methacrolein to methacrylic acid (and form t-butanol by-product) in about 75% yield (recovering and recycling unreacted methacrolein to the hydroperoxide reaction step). The by-product t-butanol, formed almost quantitatively from the hydroperoxide, is converted to methacrolein in about 60% overall yield (recycling unreacted intermediate olefin). The t-butanol formed in the original oxidation can also be converted to methacrolein in a similar manner. The overall yield of iosbutane to methacrylic acid is about 40 to 45% (mol).

The only materials consumed in making the acid are isobutane and oxygen. In the first step, the conditions of oxidation may be selected to adjust the amount of t-butanol obtained, relative to hydroperoxide and produce enough methacrolein intermediate so that inexpensive isobutane is the only organic starting material required for the manufacture of methacrylic acid. In making the ester, the appropriate alcohol is required, substantially in stoichiometric ratio to the ester.

This is a most interesting process from the economic view point, in view of the ample supplies and low cost of the isobutane.

Comparable results to the foregoing are achieved with various modifications thereof. Isobutane is normally substantially free of reactive impurities. However, it may contain some saturated lower boiling hydrocarbon as well as inert materials. The tertiary butyl hydroperoxide is obtained very economically, especially in view of the low cost raw material.

The reaction of the tertiary butyl hydroperoxide with the methacrolein may be carried out in any convenient solvent or diluent, but the tertiary butyl alcohol is preferred for making the acid, the esterifying alcohol being used for making the ester directly, where desired. Generally, the latter alcohol is primary, or sometimes secondary, preferably of one to twelve carbon atoms.

Other alcohols such as t-amyl alcohol, dimethyl propyl carbinol, methyl diethyl carbinol, dimethyl phenyl carbinol and the like may be used for making the acid. Primary or secondary alcohols may be used, such as methanol, ethanol, n- or propanol, i- or n- or s-butanol and the like pentanols or hexanols may be used. Also for making the acids, ethers such as diethyl ethers esters, ketones such as acetone may be used; or acids such as acetic acid and the like may be used as well as esters thereof such as methyl, ethyl, propyl, butyl, and the like. The lower aromatic hydrocarbons are suitable as well as the lower boiling chlorinated hydrocarbons including chlortoluene. Other saturated hydrocarbons or even unsaturated hydrocarbons may be used including purified butylenes, hexylenes, propylene trimers or tetramers, or butylene dimers or trimers using appropriate pressure to maintain the solvent in a liquid phase.

Alternate catalysts can be used for the reaction of hydroperoxides and methacrolein, but chromic acid is preferred for making the acid. Other catalysts may include phosphomolybdic acid, tungstochromic acid, selenochromic acid, phosphovanadic acid, and the like.

In producing the methyl ester directly from the aldehyde, the reaction is conveniently carried out by adding the hydroperoxide or mixture thereof together with a redox agent to a solution of the alpha, beta-ethylenic aldehyde in the chosen reactive medium, for example, methanol or the like. Ferrous or ferric ion is a particular useful redox agent and can be introduced by adding ferrous or ferric chloride or other soluble iron salt to the reaction mixture. However, any of the many other known redox agents can be used instead of or together with the ferrous or ferric ions in the new process. Suitable examples of such redox agents include the ions of other heavy metals which are capable of existence in several valence states such as cobaltous, manganous, cuprous, titanous, chromous, vanadous and like ions.

In some cases sodium bisulfite, 1-ascorbic acid, sodium formaldehyde sulfoxplate, the reducing sugars, and the like may be used to reduce the higher valence ions. The reducing agent or mixture of agents used is employed in an amount equivalent to or in an excess of, for instance, up to about 10%, the stoichiometric requirement for reduction of the t-butyl hydroperoxide. Instead of a stoichiometric amount of ferrous ions, one can, if desired, use in the process a trace of a multivalent metal, preferably ferrous or ferric ion together with another of the aforementioned other reducing agents in stoichiometric amount which will serve to reduce the ferric ion to ferrous ion as fast as the ferric ion is formed.

Ferrous ion is the preferred promoter in this type of operation and is advantageously used in amounts of about 0.25 to about 1 equivalent per mole of hydroperoxide employed. In either case, a temperature of about —20° C. to about 150° C. can be used although it is generally preferably to employ temperatures of about 0° to about +20° C. in order to minimize loss of aldehyde either through volatization or side reaction. The time of reaction is not critical.

In another alternative, the reaction is carried out by adding t-butyl hydroperoxide or mixture containing it and a redox agent to a solution of an aldehyde such as an alpha, beta-ethylenic aldehyde in the appropriate reactive primary or secondary alkanol, for example, methanol, ethanol, or other non-tertiary alcohol having up to about 12 carbon atoms in the molecule. Ferrous or ferric ion is a preferred redox agent, and it can be introduced by adding ferrous or ferric chloride or other soluble iron salt or salts to the reaction mixture; chlorides and bromides are the preferred salts. Other known redox agents which can be used instead of or together with the ferrous or ferric ions in the new process include cobaltous, manganous, stannous, cerous, nickelous, plumbous, titanous, chromous, vanadous and the like ions in solution, of mixtures thereof. These metals have atomic numbers 22 to 28, 50, 58 to 82.

The redox agent or mixtures thereof can be employed in stoichiometric amounts relative to the hydroperoxide or in excess thereof, e.g. up to about double the amount. However, less than stoichiometric amounts are operable and generally preferable. In general at least 0.05 equivalent of redox agent or agents per equivalent of hydroperoxide is used; a desirable range is 0.1 to or equivalent of agent per equivalent of hydroperoxide. As compared to the cupric ion method, this modification may be regarded as catalytic, in view of the lower amount of ion.

The redox agents may be employed in any one of their valence states. For example, equally good results are obtained with either ferrous of ferric chloride. All acidic environment is sometimes desirable, and it is achieved by adding a small amount of sulfuric or hydrochloric or other strong acid to the reaction mixture. A redox couple may be employed, for example, ferrous ferric or cobaltous-cobaltic, and the like, or a mixed couple such as cobaltous ferric, manganous-stannic and the like.

While chlorides and bromides are preferred, compounds containing other anions may be employed in practicing this alternative to produce esters. These give similar results to those shown in Examples 1 and 2 and either iron halide or mixtures thereof are preferred.

For making the ester directly, one may employ the aldehyde, the hydroperoxide, the alkanol such as methanol or the like and chromic acid (or phosphomolybdic, tungstochromic, selenochromic, phosphonavadic acid, or the like).

The concentration of the aldehyde or acrolein in the reaction mixture may be in the range of 1 to 50% by weight, preferably in the range of 10 to 20 . The reaction temperature may be from —50° C. to +150° C. desirably 0° to 100° C., and preferably in the range of room temperature or somewhat below up to about 60° C. The pressure may be atmospheric, or above or below, and the reaction time may be in the range of 10 minutes to 6 hours, and desirably 0.5 to 3 hours. For many runs, a one hour reaction time is suitable.

The ratio of the hydroperoxide is in the range of 0.1 to 2 mols per mol of the acrolein, preferably 0.5 to 1.0.

The process may be carried out batchwise, or in an intermittent or continuous manner. As the latter, the reaction may be carried out in an elongated reaction zone such as a tube or a tower or a plurality of reactors connected in series, and the hydroperoxide may be introduced at space points along the path of low of the solution or mixture.

If it is desired to produce an ester of methacrylic acid from the acid the appropriate alcohol may be added to the reaction mixture. The reaction mixture containing the added alcohol such as methanol is heated to effect esterification and remove the water formed. Then the mixture may be separated into fractions by distillation. Any catalyst present remains in the residue and it may be recovered and reused in the oxidation step, optionally with intermediate purification.

In view of the foregoing disclosures, variations and modficiations thereof will be apparent to one skilled in the art, and it is intended to include within the invention all such variations and modifications except as do not come within the scope of the appendix claims.

What is claimed is:

1. A process for the production of methacrylic acid wherein isobutane and oxygen are the only reactants consumed in the process which comprises: (1) reacting isobutane with molecular oxygen, thereby producing a first reaction product containing t-butyl hydroperoxide and t-butyl alcohol; (2) reacting said t-butyl hydroperoxide in said first reaction product with methacrolein, thereby producing a second reaction product containing methacrylic acid and additional t-butyl alcohol; (3) separating said methacrylic acid as product; (4) catalytically dehydrating in vapor phase said t-butyl alcohol from said first and second reaction mixtures at a temperature of 150 to 500° C., thereby forming isobutylene; (5) reacting said isobutylene with molecular oxygen at a temperature of 150 to 600° C., thereby forming methacrolein; and (6) recycling said methacrolein to step (2) above.

2. A process for the production of methacrylic acid where in isobutane and oxygen are the only reactants consumed in the process which comprises: (1) reacting isobutane with molecular oxygen, iron ions being present when said reaction is carried out in liquid phase, thereby producing a first reaction product containing t-butyl hydroperoxide and t-butyl alcohol; (2) reacting said t-butyl hydroperoxide in said first reaction product with methacrolein, thereby producing a second reaction product containing methacrylic acid as products; (3) reacting said t-butyl alcohol from said first and second reaction mixtures with molecular oxygen at a temperature of 300 to 400° C., thereby forming methacrolein; (4) and recycling said methacrolein to step (2) above.

3. A process for the production of a methacrylate ester which comprises: (1) reacting isobutane with molecular oxygen, iron ions being present when said reaction is carried out in liquid phase thereby producing a first reaction product containing t-butyl hydroperoxide and t-butyl alcohol; (2) reacting said t-butyl hydroperoxide in said first reaction product with methacrolein in the presence of an alkanol, thereby producing a second reaction product containing a methacrylate ester and additional t-butyl alcohol; (3) separating said methacrylate ester as product; (4) catalytically dehydrating in vapor phase said t-butyl alcohol from said first and second reaction mixtures in the presence of a catalyst at a temperature of 150 to 500° C., thereby forming isobutylene; (5) reacting said isobutylene with molecular oxygen at a temperature of 150 to 600° C., thereby forming methacrolein; and (6) recycling said methacrolein to step (2) above.

4. A process for the production of a methacrylate ester which comprises: (1) reacting isobutane with molecular oxygen, iron ions being present when said reaction is carried out in a liquid phase thereby producing a first reaction product containing t-butyl hydroperoxide and t-butyl alcohol; (2) reacting said t-butyl hydroperoxide in said first reaction product with methacrolein in the presence of an alkanol, thereby producing a second reaction product containing methacrylic acid and additional t-butyl alcohol; (3) separating said methacrylate ester as product; (4) reacting said t-butyl alcohol from said first and second reaction mixtures with molecular oxygen at a temperature of 300 to 400° C., thereby forming methacrolein; and (5) recycling said methacrolein to step (2) above.

5. The process of claim 1 wherein step (5) is performed in the presence of a chromic acid catalyst on a refractory support.

6. The process of claim 2 wherein step (3) is carried out in the presence of a phosphomolybdic acid catalyst on a refractory support.

7. The process of claim 1 wherein step (2) is performed in the presence of a chromic acid catalyst.

References Cited
UNITED STATES PATENTS

| | | | |
|---|---|---|---|
| 2,181,640 | 11/1939 | Deanesly et al. | 260—682 |
| 2,451,485 | 10/1948 | Hearne et al. | 260—604 |
| 2,744,928 | 5/1956 | Smith | 260—530 |
| 2,744,929 | 5/1956 | Smith | 260—530 |
| 2,845,461 | 7/1958 | Winkler | 260—610 |

OTHER REFERENCES
Fieser et al.: Organic Chemistry, pp. 128–132 (1944).

LORRAINE A. WEINBERGER, Primary Examiner
ALBERT P. HALLUIN, Assistant Examiner

U.S. Cl. X.R.

260—526, 530, 533, 603, 604, 610, 632, 682